March 29, 1955
M. G. ANDIS
2,704,887
BLADE GUIDING AND DRIVING ASSEMBLY
FOR HAIR CLIPPERS AND SHAVERS
Filed March 15, 1951
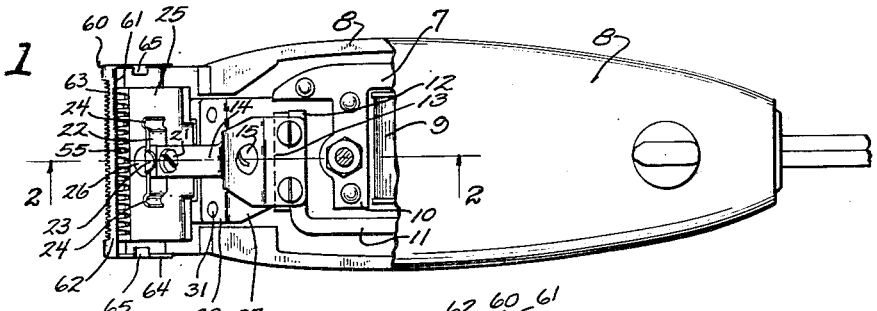
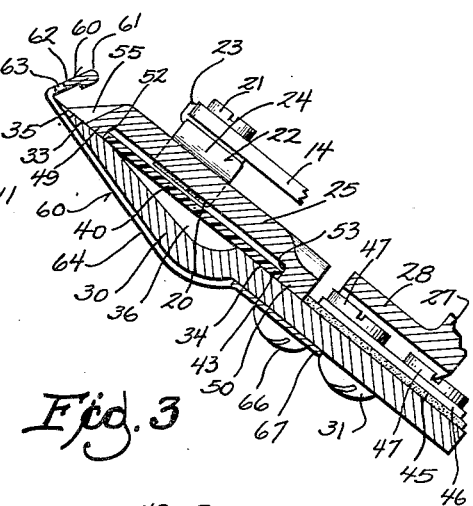
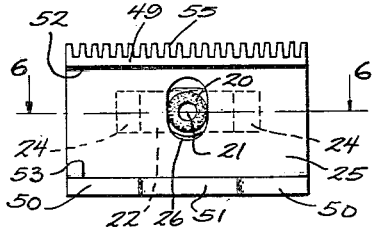
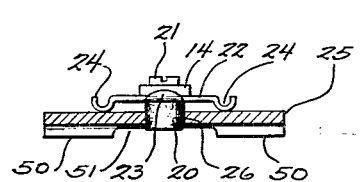
Inventor
MATTHEW G. ANDIS
By
Wheeler, Wheeler & Wheeler
Attorneys

United States Patent Office 2,704,887
Patented Mar. 29, 1955

2,704,887

BLADE GUIDING AND DRIVING ASSEMBLY FOR HAIR CLIPPERS AND SHAVERS

Matthew G. Andis, Racine, Wis., assignor to Andis Clipper Co., Racine, Wis., a corporation of Wisconsin Application March 15, 1951, Serial No. 215,740

8 Claims. (Cl. 30—210)

This invention relates to a blade guiding and driving assembly for hair clippers and shavers.

The invention provides for a reduction in cost of manufacture, and smoother operation by separately fabricating and attaching to the shear plate of a clipper or shaver a guide member for the reciprocable blade, thus eliminating the costly operation of machining the guide surfaces in the hardened steel of the shear plate, and enabling the use of materials for the guiding surfaces with which the reciprocable blade will interact without requiring lubrication and without seizing or binding.

The invention further contemplates a special driving arrangement for a reciprocable blade so guided, plastic being used both in the guiding means and in the oscillatory drive to the reciprocable blade.

In the shear plate assembly, not only is the guiding means separately prefabricated, but to minimize machining operations on the very hard metal of the shear plate, I may also prefabricate and separately attach to the shear plate a guide which is distinctive in construction and design to facilitate the use of the device as a shaver.

In the drawings:

Fig. 1 is a plan view of the forward end of a reciprocable blade clipper, of a type such as is used in shaving, portions of the case being broken away to expose the shearing head.

Fig. 2 is a view on an enlarged scale taken in section on the line 2—2 of Fig. 1.

Fig. 3 is a view further enlarged, taken in section on line 3—3 of Fig. 4.

Fig. 4 is a plan view of the blade assembly with portions of the reciprocable blade broken away to expose the plastic guide element which is fastened to the shear plate.

Fig. 5 is a bottom plan view of the reciprocable blade and driver.

Fig. 6 is a view taken in section on the line 6—6 of Fig. 5.

Although the present invention is not concerned with the motor, portions of a motor of the vibratory armature type are illustrated in Fig. 1 and Fig. 2. There is a core frame 7 mounted in the clipper case 8 and supporting winding 9. The poles, one of which is shown at 10, are energized intermittently, as by alternating current, to attract the vibratory armature 11, which has a transversely extending arm 12 in advance of the motor.

Screwed to the arm 12 of armature 11 is the mounting portion 13 of the tension spring 14. Passing through the mounting portion is a tension adjusting screw 15 threaded into an ear 16 of the armature. At its outer end, the tension spring 14 carries a driving collar 20 which desirably takes the form of a plastic bead internally screw threaded to receive the screw 21 which passes through the end of the tension spring 14 to hold the bead to the spring. Screw 21 also passes through an aperture in an equalizing spring 22 having an upturned lip 23 engaged with the end of the tension spring 14 to hold the equalizing spring at right angles. The equalizing spring has its end portions 24 turned downwardly and thence curving upwardly as shown in Figs. 1 and 6 to rest on the upper surface of the reciprocable cutting blade 25 at points spaced laterally from the elongated slot 26 in such blade wherein the driving collar 20 is confined. Due to the fact that the blade is reciprocable in a plane obliquely inclined with reference to the plane in which the armature 11 oscillates, it is necessary to accommodate relative displacement between the tension spring and the blade in addition to relative oscillation of the tension spring respecting the plate. The cylindrical form of the driving collar 20 accommodates the oscillation. Relative displacement due to the fact that the blade reciprocates, while the armature and tension spring oscillate, is accommodated by the length of the slot 26, while the slight rocking movement attributable to the difference in angle of the planes aforesaid is accommodated by the transverse equalizing spring 22 and the movement permitted the cylindrical collar in slot 26.

A bracket 27 projecting forwardly from the clipper case, as shown in Figs. 2 and 3, has an upwardly inclined arm 28 to which the shear plate 30 is held by screws 31 (Fig. 3, passing through apertures 32) Fig. 4. The shear plate is provided with ground bearing surfaces at 33, 34, and is provided at its forward margin with notches defining very fine teeth 35 which project from bearing space 33. The concavity of the blade at 36 between the bearing surfaces is merely for relief.

Spanning the concavity at 36 is the prefabricated guide member 40 desirably made of plastic and preferably cut from a sheet of plastic. It is generally rectangular but has marginal guide surfaces only at its corners at 41, 42, 43, and 44, as best shown in Fig. 4. Between surfaces 41 and 42 at its outer margin and surfaces 43 and 44 on its rear margin it is relieved. Projecting centrally from its rear margin is a mounting tongue 45 anchored by screws 46 to the guide plate 30. The heads of screws 46 may engage an apertured clamp plate 47 to distribute on the surface of guide member 40 the clamping pressure of screws 46. The unused central part of guide member 40 may be cut away at 48 so as not to obstruct the freedom of movement of the driving collar 20.

The under surface of the reciprocable blade 25 is channeled as best shown in Fig. 3. Its flanges project downwardly to provide a forward bearing flange 49 sliding on the bearing surface 33 of the shear plate. Its rear flange 50 is discontinuous, being relieved at 51 to clear the positioning arm 45 of guide member 40. The discontinuous bearing flange 50 rides upon the shear plate bearing surface 34.

The inner margin 52 of the forward flange of the reciprocable blade 25 bears against the marginal surfaces 41 and 42 of guide member 40, while the inner surface 53 of the rear flange of blade 25 bears against the rear marginal bearing surface 43 and 44 of guide member 40. The complementary finished surfaces of the hardened steel blade 25 and the plastic guide element 40 accurately guide the reciprocation of the blade with a minimum of friction and much less expense than would be required to grind similar marginal surfaces on the hardened steel of the shear plate 30. By fabricating the guide member 40 from plastic, the blade 25 moves smoothly to reciprocate its teeth 55 over the teeth 35 of the shear plate to effect the desired shearing action.

The guard, generically represented by reference character 60, comprises a light metallic frame with its margin stiffened at 61 by folding the metal back upon itself. The cross bar portion 62 of this frame has fine teeth 63 which desirably are spaced forwardly from, and register with the underlying teeth 35 of the shear plate but are obliquely disposed with reference to the plane of the shear plate, at an obtuse angle thereto, as clearly illustrated in Figs. 2, 3, and 4. The tooth cross bar 62 of the guard frame 60 is supported by arms 64 which embrace the sides of the shear plate, as best shown in Figs. 1 and 4, and are connected thereto by ears 65 underlying the top of the shear plate and by a single screw 66 passing through the rear transverse bar portion 67 of the guard frame.

The rearward rake of the forward cross bar 62 of the guard frame, plus the provision of the teeth 63 therein, permits the hair to reach the teeth of the shear plate and yet guards the flesh from being caught between the teeth of the shear plate and the reciprocating blade. The separate prefabrication of the guard frame greatly reduces the expense of providing the shear plate with a corresponding guard; yet the flanged construction of the arms 64 and the engagement of these arms and their ears 65 with the shear plate provides a construction substantially as rigid as if the guard and the shear plate were made in one piece.

While the device resembles a hair clipper, and may be used as a hair clipper, the fineness of its teeth adapt it for dry shaving. Therefore, reference to the device as a clipper is intended to be generic and not to preclude the utility of the clipper for shaving purposes.

I claim:

1. In a clipper, the combination with a shear plate having planiform bearing surfaces and a shear blade reciprocable thereon and having marginal guide surfaces, of a guide element separate from the shear plate but secured in face relation to the planiform bearing surfaces of the shear plate and having marginal guide surfaces complementary to those of the reciprocable blade.

2. The device of claim 1 in which the guide element comprises a plastic sheet.

3. The device of claim 1 in which the guide element is T-shaped, having a head portion marginally provided with the aforesaid complementary guide surfaces and a shank portion projecting rearwardly from beneath the blade, the means securing the guide element to the shear plate comprising screws passing through said shank portion into said shear plate, the head of the guide element depending solely upon the shank portion for its position.

4. In a clipper, the combination with a shear plate having top bearing surfaces and a channel shaped shear blade having downwardly turned flanges marginally bearing upon said surfaces, of a guide element separate from the shear plate but housed within the channel shaped blade and provided with means connecting it with the bearing surfaces of the shear plate, the said element having marginal bearing surfaces complementary to the respective flanges and fitted thereto.

5. The device of claim 4 in which the said guide element is T-shaped having a head portion provided with the aforesaid marginal guiding surfaces and having a rearwardly projecting shank, one of said flanges of said blade being relieved to span said shank and the securing means connecting the guide element with the shear plate being applied to said shank exclusively.

6. The device of claim 5 in which the said element comprises a plastic sheet.

7. In a clipper head a shear plate having spaced transversely extending substantially planiform bearing surfaces and a guide element marginally supported in face relation on said surfaces, said guide element being provided along its opposite margins supported on said bearing surfaces with transverse guide surfaces.

8. The device of claim 7 in which the guide element is provided with a shank portion projecting beyond one of said guide surfaces and means connecting only said shank portion with said shear plate.

References Cited in the file of this patent

UNITED STATES PATENTS

| | | |
|---|---|---|
| 1,729,332 | Dremel | Sept. 24, 1929 |
| 1,822,262 | Apple | Sept. 8, 1931 |
| 1,835,613 | Perlman | Dec. 8, 1931 |
| 1,908,385 | Wahl | May 9, 1933 |
| 2,253,195 | Oster | Aug. 19, 1941 |
| 2,271,053 | Wahl | Jan. 27, 1942 |

FOREIGN PATENTS

| | | |
|---|---|---|
| 656,403 | Germany | of Oct. 23, 1935 |